US010322374B2

(12) United States Patent
Sørensen et al.

(10) Patent No.: US 10,322,374 B2
(45) Date of Patent: Jun. 18, 2019

(54) PROCESS FOR THE REMOVAL OF SOOT FROM A SULFUROUS GAS STREAM

(71) Applicant: Haldor Topsøe A/S, Kgs. Lyngby (DK)

(72) Inventors: Per Aggerholm Sørensen, Søborg (DK); Kurt Agerbæk Christensen, Birkerød (DK)

(73) Assignee: Haldor Topsoe A/S, Lyngby (DE)

( * ) Notice: Subject to any disclaimer, the term of this patent is extended or adjusted under 35 U.S.C. 154(b) by 0 days.

(21) Appl. No.: 15/567,005

(22) PCT Filed: Apr. 13, 2016

(86) PCT No.: PCT/EP2016/058079
§ 371 (c)(1),
(2) Date: Oct. 16, 2017

(87) PCT Pub. No.: WO2016/169822
PCT Pub. Date: Oct. 27, 2016

(65) Prior Publication Data
US 2018/0093225 A1 Apr. 5, 2018

(30) Foreign Application Priority Data
Apr. 21, 2015 (DK) .................................. 2015 00245

(51) Int. Cl.
*B01D 53/94* (2006.01)
*B01J 21/08* (2006.01)
*B01J 21/04* (2006.01)
*B01J 23/22* (2006.01)
*B01J 27/053* (2006.01)
*B01D 53/86* (2006.01)
*B01J 27/055* (2006.01)

(52) U.S. Cl.
CPC ......... *B01D 53/944* (2013.01); *B01D 53/864* (2013.01); *B01J 21/04* (2013.01); *B01J 21/08* (2013.01); *B01J 23/22* (2013.01); *B01J 27/053* (2013.01); *B01D 2255/202* (2013.01); *B01D 2255/20723* (2013.01); *B01D 2255/30* (2013.01); *B01D 2255/707* (2013.01); *B01J 27/055* (2013.01)

(58) Field of Classification Search
CPC . B01J 21/08; B01J 23/22; B01J 27/055; B01J 21/04; B01J 27/053; B01D 2255/202; B01D 2255/30; B01D 2255/707; B01D 53/944; B01D 2255/20723
See application file for complete search history.

(56) References Cited

U.S. PATENT DOCUMENTS

| 3,249,558 | A | 5/1966 | Kearby et al. |
| 4,184,980 | A * | 1/1980 | Sherif ................ B01J 23/22 |
| | | | 423/535 |
| 4,317,745 | A | 3/1982 | Hsieh |
| 4,431,573 | A | 2/1984 | Fennemann et al. |
| 6,013,599 | A | 1/2000 | Manson |
| 6,764,664 | B2 | 7/2004 | Zhang |
| 8,323,610 | B2 * | 12/2012 | Kramer ................ B01J 37/0201 |
| | | | 423/533 |
| 2003/0198583 | A1 | 10/2003 | Zhang |
| 2009/0209415 | A1 | 8/2009 | Kayama et al. |
| 2011/0283680 | A1 | 11/2011 | Gekas et al. |

FOREIGN PATENT DOCUMENTS

| EP | 0 047 540 A1 | 3/1982 |
| EP | 0 514 941 A1 | 11/1992 |
| EP | 2 703 080 A1 | 3/2014 |
| JP | 2010-51867 A | 3/2010 |
| JP | 2010-242628 A | 10/2010 |
| WO | WO 90/12646 A1 | 11/1990 |
| WO | 2013182502 A1 | 12/2013 |
| WO | WO 2014/169967 A1 | 10/2014 |
| WO | 2017029169 A1 | 2/2017 |

OTHER PUBLICATIONS

S.J. Jelles et al., "Molten salts as promising catalysts for oxidation of diesel soot: Importance of experimental conditions in testing procedures," Applied Catalysis B: Environmental, Amsterdam, NL, vol. 21, pp. 35-49, Jan. 1, 1999.
A. Setiabudi et al., "The Influence of NOx on soot oxidation rate: molten salt versus platinum," Applied Catalysis B: Environmental, Amsterdam, NL, vol. 35, No. 3, pp. 159-166, Jan. 10, 2002.
E. Saab et al., "Carbon black oxidation in the presence of $Al_2O_3$, $CeO_2$, and Mn oxide catalysts: An EPR study," Catalysis Today, 119, pp. 286-290 (2007).
J.P. Neeft et al., "Catalytic Oxidation of carbon black—I. Activity of catalysts and classification of oxidation profiles," Fuel, vol. 97, No. 3, pp. 111-119 (1998).
P. Ciambelli et al., Catalytic Oxidation of an Amorphous Carbon Black, Combustion and Flame, vol. 99, pp. 413-421 (1994).
M. Bokova et al., "Effects of ozone on the catalytic combustion of carbon black," Applied Catalysis B: Environmental, vol. 54, pp. 9-17 (2004).
Third Party Observations for EP Application No. 16 715 588.6 dated Nov. 9, 2018.
Compilation of Air Pollutant Emission Factors; vol. 1, Stationary Point and Area Sources; Office of Air Quality Planning and Standards, Office of Air and Radiation, U.S. Environmental Protection Agency, Jan. 1995.

(Continued)

*Primary Examiner* — Timothy C Vanoy
(74) *Attorney, Agent, or Firm* — Buchanan Ingersoll & Rooney PC

(57) ABSTRACT

In a process for the removal of soot from a sulfurous gas stream, a process gas containing $O_2$ and more than 500 ppm $SO_2$ and/or $SO_3$ together with soot is brought into contact with a VK type catalyst in a reactor, said catalyst comprising vanadium pentoxide ($V_2O_5$), sulfur in the form of sulfate, pyrosulfate, tri- or tetrasulfate and one or more alkali metals, such as Na, K, Rb or Cs, on a porous carrier, preferably a silicon dioxide carrier.

22 Claims, No Drawings

(56) References Cited

OTHER PUBLICATIONS

PCT International Search Report and Written Opinion for PCT/EP/2016/058079, dated Jun. 13, 2016.
Van Setten, Baal, et al., Molten Salts are Promising Catalysts. How to apply in practice?, Topics in Catalysts, 2001, pp. 275-278, vols. 16/17, Nos. 1-4, Plennum Publishing Corporation.
SNOX Flue Gas Cleaning Demonstration Project: A DOE Assessment, Jun. 2000, Us Department of Energy, National Energy Technology Laboratory.
CMAC Guide to Diesel Exhaust Emissions Control of NOx, SOx, Particulates, Smoke and CO2, Seagoing Ships and Large Stationary Diesel Power Plants, The International Council of Combustion Engines, 2008, No. 28.
Simulation of a WSA process for SO2 Containing Off Gases from the Metallurgical Industry, Haldor Topsoe A/S , May 13, 2008.
Schoubye, P. et al., SNOX flue gas treatment for boilers burning petcoke . . . makes petcoke more attractive for power and heat generation, Haldor Topsoe, 2007.

\* cited by examiner

PROCESS FOR THE REMOVAL OF SOOT FROM A SULFUROUS GAS STREAM

The present invention is related to the removal of soot from sulfurous process gas streams by carbon oxidation with the aid of a catalyst of the VK type, prepared and sold by the applicant.

Soot is the common word for impure carbon particles resulting from the incomplete combustion of hydrocarbons. It is a powder-like form of amorphous carbon. The gas-phase soots contain polycyclic aromatic hydrocarbons (PAHs). Most properly it is restricted to the product of the gas-phase combustion process, but it is commonly extended to include the residual pyrolysed fuel particles, such as coal, charred wood, petroleum coke, etc., which may become airborne during pyrolysis and which are more properly identified as cokes or chars.

Soot as an airborne contaminant in the environment has many different sources, all of which are results of some form of pyrolysis. They include soot from coal burning, internal combustion engines, power plant boilers, ship boilers, central steam heat boilers, waste incineration, local field burning, house fires, forest fires, fireplaces, furnaces, etc. The formation of soot depends strongly on the fuel composition. The rank ordering of the tendency of fuel components to produce soot is: naphthalenes→benzenes→aliphatics. This phenomenon is also known as cracking. However, the order of sooting tendencies of the aliphatics (alkanes, alkenes, alkynes) varies dramatically depending on the flame type. The difference between the sooting tendencies of aliphatics and aromatics is thought to result mainly from the different routes of formation. Aliphatics appear to first form acetylene and polyacetylenes, which is a slow process; aromatics can form soot both by this route and also by a more direct pathway involving ring condensation or polymerization reactions building on the existing aromatic structure.

Carbon black is a specific variant of soot produced by the incomplete combustion of heavy petroleum products like tar, coal tar, ethylene cracking tar, and a small amount from vegetable oil. Carbon black is a form of paracrystalline carbon that has a high surface area-to-volume ratio, albeit lower than that of activated carbon. It is dissimilar to ordinary soot in its much higher surface area-to-volume ratio and significantly lower (negligible as well as non-bioavailable) PAH content. However, carbon black is widely used as a model compound for diesel soot for diesel oxidation experiments. Carbon black is mainly used as a reinforcing filler in tires and other rubber products. In plastics, paints and inks, carbon black is used as a color pigment.

The catalytic combustion of soot is well-known within the automotive field, especially diesel engines. Thus, in U.S. Pat. No. 6,764,664 a catalyst composition is disclosed for the reduction of soot and undesirable gaseous emissions from engine exhaust, particularly exhaust from diesel engines. The catalyst contains a catalytic alkali metal oxide, preferably lithium platinum oxide, in which the catalytic metal is atomically isolated. For improved performance in a diesel particulate filter, the alkali catalytic metal oxide is uniformly dispersed on an alkali metal aluminate such as lithium aluminate.

WO 1990/012646 also deals with catalytic combustion of soot from diesel engines. In order to obtain said catalytic combustion, the exhaust gases are conveyed over a catalyst material comprising vanadium and copper oxides in a molar ratio V:Cu of 85:15 to 95:5, preferably 90:10. In order to increase the activity at low temperatures, the catalyst preferably also contains elementary platinum, palladium or rhodium.

Applicant's US 2011/0283680 relates to a method for purification of exhaust gas from a diesel engine in a system, which comprises a device for selective catalytic reduction and a diesel particulate filter, preferably at least partially covered by a catalytic layer installed downstream of the device for selective catalytic reduction. A device for catalytic oxidation is installed upstream of the device for selective catalytic reduction and/or between said device and the diesel particulate filter. The selective catalytic reduction preferably takes place in the presence of a vanadium-based catalyst, which is vanadium oxide on titanium oxide with possible addition of tungsten or molybdenum oxides.

WO 2014/169967, also belonging to the applicant, relates to a method and a system for removal of soot, ash and heavy metals, and optionally additionally NOx and SOx being present in the exhaust gas from an engine operated on heavy fuel oil with a sulfur content of 0.1%-4.0 wt % and a heavy metal element content of 5 mg/kg to 1000 mg/kg. The catalyst used in the system preferably comprises titanium dioxide, oxides of vanadium and tungsten and metallic palladium.

Finally, U.S. Pat. No. 6,013,599 describes a low temperature diesel exhaust soot oxidation catalyst comprising a porous refractory metal or metal oxidic support and a wash coat. The wash coat is formed by the steps of mixing an acidic iron-containing compound and a copper-containing compound, adding an aqueous alkali metal solution, adding an acidic vanadium compound containing solution and adding an alkaline earth metal compound solution. The copper-containing compound can be copper sulfate, and the vanadium-containing compound can be vanadium pentoxide. The exhaust may comprise sulfur compounds, but there is no indication of the exhaust comprising more than 500 ppm $SO_2$ and/or $SO_3$.

While the catalytic combustion of soot on vanadium catalysts is well described in patent documents within the automotive field, this is not the case for VK type catalysts for the combustion of soot or carbon black. So far, catalytic oxidation of carbon black seems to be described only in a few scientific articles, viz. Carbon black oxidation in the presence of $Al_2O_3$, $CeO_2$ and Mn oxide catalysts: An EPR study, in *Catalysis Today* 119, 286-290 (2007), Catalytic oxidation of carbon black—I. Activity of catalysts and classification of oxidation profiles, in *Fuel* 97(3), 111-119 (1998), Catalytic oxidation of an amorphous carbon black, in *Combustion and Flame* 99, 413-421 (1994), and Effects of ozone on the catalytic combustion of carbon black, in *Applied Catalysis B: Environmental* 54, 9-17 (2004).

The present invention relates to a method for removal of soot from varying sulfurous process gas streams by carbon oxidation using a catalyst of the VK type. Generally, VK catalysts can be used to oxidize $SO_2$ to $SO_3$ in sulfuric acid plants, and they consist of vanadium (as $V_2O_5$), sulfur (as sulfate, pyrosulfate, tri- or tetrasulfate), $SiO_2$ and alkali metals, such as Li, Na, K, Rb and Cs and mixtures thereof, as promoters. VK catalysts can be used in conjunction with other catalyst types, such as SCR (selective catalytic removal), for removal of NOx.

More specifically, the invention concerns a process for the removal of soot from a sulfurous gas stream, wherein a process gas containing $O_2$ and more than 500 ppm $SO_2$ and/or $SO_3$ together with soot is brought into contact with a VK type catalyst in a reactor, said catalyst comprising vanadium pentoxide ($V_2O_5$), sulfur in the form of sulfate, pyrosulfate, tri- or tetrasulfate and one or more alkali metals on a porous carrier.

The alkali metals are preferably selected from Na, K, Rb and Cs.

The porous carrier of the catalyst is preferably silicon dioxide ($SiO_2$), optionally containing a minor amount of alumina (up to 10 wt %, preferably up to 5 wt % and most preferably up to 2 wt % or 1 wt %).

An overview of applicant's VK catalysts is given in Table 1 below. The ignition temperature of the catalyst, i.e. the temperature at which the melt becomes active, can be up to 100° C. lower than the operating temperature.

TABLE 1

| VK catalyst type | VK38 | VK48 | VK59 | VK-WSA |
|---|---|---|---|---|
| $V_2O_5$ content, wt % | 5-9 | 6-10 | 5-9 | 5-9 |
| Alkali metal content, wt % | 10-16 | 10-16 | 10-16 | 10-16 |
| Operating temperature, ° C. | 400-630 | 400-550 | 370-450 | 400-550 |

According to the invention, a process gas containing $O_2$ and $SO_2$ and/or $SO_3$ together with soot is brought into contact with a VK type catalyst, as defined above, in a reactor. The soot in the process gas does not combust upon exposure to the normal operating temperature conditions of a VK catalyst, but it has turned out that it does combust under these temperature conditions when it is brought into contact with said catalyst type. The combustion occurs because of the presence of an alkali metal pyrosulfate melt which is formed on the surface of the catalyst in the presence of $SO_2$ and/or $SO_3$.

This leads to a number of benefits: First of all there is not any pressure drop, which could be caused by accumulation of soot in the catalyst bed, and therefore extended periods between screening of the catalyst are possible. An added benefit comes from the fact that the combustion of soot reduces the required inlet temperature to the catalyst bed, e.g. by 3° C. for a soot load of 100 mg/Nm³/h, which in turn reduces the amount of energy needed to heat the process gas upstream the reactor. Furthermore, since the soot is combusted on the VK catalyst, less removal of soot is required upstream the reactor, where electrostatic filters, bag filters or ceramic filters are typically used.

The alkali metal content in the catalyst used in the process of the invention is 2-25 wt %, preferably 4-20 wt % and most preferably 8-16 wt %. The catalyst contains 1-15 wt % $V_2O_5$, preferably 2-12 wt % and most preferably 4-10 wt % $V_2O_5$.

Furthermore, the catalyst used in the process of the invention contains 1-25 wt % sulfur, preferably 2-20 wt % or 3-18 wt % and most preferably 4-16 wt % or 4-10 wt % sulfur, in the form of sulfate, pyrosulfate, tri- or tetrasulfate.

In the process of the invention, the catalyst temperature is between 250 and 700° C., preferably between 300 and 650° C.

The process gas has a soot concentration of >0.1 mg/Nm³/h, and the soot concentration can be more than 50 mg/Nm³/h with the preferred concentrations of >0.5 mg/Nm³/h, >1 mg/Nm³/h, >2 mg/Nm³/h, >5 mg/Nm³/h, >10 mg/Nm³/h and >20 mg/Nm³/h in between.

The process gas preferably contains more than 1000 ppm $SO_2$ and/or $SO_3$, preferably more than 2500 ppm $SO_2$ and/or $SO_3$ and most preferably more than 5000 ppm $SO_2$ and/or $SO_3$.

Moreover, the process gas has a soot composition comprising >20 wt % C. Preferably the process gas has a soot composition comprising >50 wt % C, >75 wt % C, >90 wt % C or even >95 wt % C.

In a preferred embodiment of the process according to the invention, the soot is carbon black. Carbon black can be differentiated from most other types of soot, such as the soot originating from combustion engines, in the elemental composition and the surface area-to-volume ratio.

The invention is illustrated in more detail in the following example without being limited thereto.

EXAMPLE

The ability of the VK-WSA catalyst to remove soot at 400° C. was tested by covering the surface of the catalyst with carbon black of the type Printex U and exposing the soot-covered catalyst to a gas in a reactor. The gas contained 10 vol % $SO_2$ and 10 vol % $O_2$.

A comparative study of the thermal oxidation of carbon black in air at 400° C. showed a considerably lower removal of soot. The results are shown in Table 2 below.

TABLE 2

| Treatment | Thermal oxidation at 400° C. | VK-WSA at 400° C. |
|---|---|---|
| Soot removal, wt % | 47 | >99 |

The invention claimed is:

1. A process for the removal of soot comprising >90 wt % C from a sulfurous gas stream, wherein a process gas containing $O_2$ and more than 500 ppm $SO_2$ and/or $SO_3$ and a soot concentration of >2 mg/Nm³/h is brought into contact with a catalyst in a reactor, said catalyst comprising vanadium pentoxide ($V_2O_5$), sulfur in the form of sulfate, pyrosulfate, tri- or tetrasulfate and one or more alkali metals on a porous carrier.

2. Process according to claim 1, wherein the porous carrier of the catalyst is silicon dioxide ($SiO_2$).

3. Process according to claim 2, wherein the porous carrier of the catalyst is $SiO_2$ with <10 wt % of alumina.

4. Process according to claim 3, wherein the porous carrier of the catalyst is $SiO_2$ with <2 wt % of alumina.

5. Process according to claim 3, wherein the porous carrier of catalyst is $SiO_2$ with <1 wt % of alumina.

6. Process according to claim 1, wherein the alkali metal content of the catalyst is 2-25 wt %.

7. Process according to claim 1, wherein the catalyst contains 1-15 wt % $V_2O_5$.

8. Process according to claim 7, wherein the catalyst contains 2-12 wt % $V_2O_5$.

9. Process according to claim 1, wherein the catalyst contains 1-25 wt % sulfur in the form of sulfate, pyrosulfate, tri- or tetrasulfate.

10. Process according to claim 9, wherein the catalyst contains 2-20 wt % sulfur in the form of sulfate, pyrosulfate, tri- or tetrasulfate.

11. Process according to claim 10, wherein the catalyst contains 4-16 wt % sulfur in the form of sulfate, pyrosulfate, tri- or tetrasulfate.

12. Process according to claim 1, wherein the catalyst temperature is 250-700° C.

13. Process according to claim 12, wherein the catalyst temperature is 300-650° C.

14. Process according to claim 1, wherein the process gas has a soot concentration of >5 mg/Nm$^3$/h.

15. Process according to claim 14, wherein the process gas has a soot concentration of >20 mg/Nm$^3$/h.

16. Process according to claim 14, wherein the process gas has a soot concentration of >50 mg/Nm$^3$/h.

17. Process according to claim 1, wherein the process gas contains more than 1000 ppm $SO_2$ and/or $SO_3$.

18. Process according to claim 17, wherein the process gas contains more than 5000 ppm $SO_2$ and/or $SO_3$.

19. Process according to claim 1, wherein the soot in the process gas has a composition comprising >95 wt % C.

20. Process according to claim 1, wherein the soot is carbon black.

21. Process according to claim 1, wherein the alkali metal content of the catalyst is 8-16 wt %.

22. Process according to claim 1, wherein the process gas contains more than 2500 ppm $SO_2$ and/or $SO_3$.

* * * * *